(12) United States Patent
Borella et al.

(10) Patent No.: US 7,330,453 B1
(45) Date of Patent: Feb. 12, 2008

(54) SYSTEM AND METHOD FOR INTEGRATING CALL CONTROL AND DATA NETWORK ACCESS COMPONENTS

(75) Inventors: Michael Borella, Naperville, IL (US); Ali Akgun, Chicago, IL (US)

(73) Assignee: 3Com Corporation, Marlborough, MA (US)

( * ) Notice: Subject to any disclaimer, the term of this patent is extended or adjusted under 35 U.S.C. 154(b) by 951 days.

(21) Appl. No.: 10/448,958

(22) Filed: May 31, 2003

(51) Int. Cl.
*H04Q 7/24* (2006.01)
*H04L 12/66* (2006.01)

(52) U.S. Cl. ............ 370/338; 370/320; 370/352; 370/354

(58) Field of Classification Search ........ 370/338, 370/401, 328, 468, 466, 389, 352, 354, 429, 370/254, 230
See application file for complete search history.

(56) References Cited

U.S. PATENT DOCUMENTS

| | | | |
|---|---|---|---|
| 6,259,776 B1 * | 7/2001 | Hunt | 379/114.01 |
| 6,798,786 B1 * | 9/2004 | Lo et al. | 370/468 |
| 7,164,913 B1 * | 1/2007 | Dantu et al. | 455/436 |
| 2003/0063616 A1 * | 4/2003 | Lee | 370/401 |
| 2003/0063623 A1 * | 4/2003 | Leslie et al. | 370/466 |
| 2003/0128694 A1 * | 7/2003 | Hundscheidt et al. | 370/352 |
| 2004/0109414 A1 * | 6/2004 | Choi et al. | 370/230 |
| 2007/0189279 A1 * | 8/2007 | Thalanany et al. | 370/356 |

* cited by examiner

*Primary Examiner*—Congvan Tran
(74) *Attorney, Agent, or Firm*—McDonnell Boehnen Hulbert & Berghoff LLP

(57) ABSTRACT

A system and method for integrating the call control signaling pathway with data network access components. A call control server agent is resident on a network device that provides a first interface from an access network to a packet-switched data network. The call control server agent receives data session initiation requests and passes the requests to the call control server agent. The call control server agent also performs proxy server functions and provides a source of information relating to data sessions directly to the access network.

55 Claims, 5 Drawing Sheets

SYSTEM AND METHOD FOR INTEGRATING CALL CONTROL AND DATA NETWORK ACCESS COMPONENTS

BACKGROUND OF THE INVENTION

A. Field of the Invention

The present invention relates to the field of voice and data communications, and more particularly to integrating call control signaling with data network access components.

B. Description of the Related Art

Third generation wireless technology and services (3G) are currently being deployed around the globe. Currently, there are two families of these technologies, the CDMA2000 standard and General Packet Radio Service/Universal Mobile Telecommunication System (GPRS/UMTS). The two competing families implement different network access technologies, however, higher layer signaling and control protocols are expected to be similar. It is believed that the Session Initiation Protocol (SIP) based call control signaling will be used for both CDMA2000 and UMTS networks.

Once applications become available and users increasingly adopt one of the 3G families, the new applications available to subscribers via the greater bandwidth and access to the Internet will grow in both volume and complexity. Examples of such applications include Voice over Internet Protocol (VoIP) telephony, and applications in which the user may access services from a mobile phone that are typically only available on purely data network connections (e.g. Web resources using the Wireless Applications Protocol (WAP)).

The present infrastructure somewhat complicates the ability for service providers to provide data network applications. Many carriers have different wireless and softswitch divisions that, in most cases, do not communicate very closely with one another. For example, when a user communicates to a data network application resource, billing information associated with that resource (e.g. volume of data communicated, session lengths, failed connections, etc.) would have to be retrieved from points in the system that are removed from the service provider's typical source of billing information. In the case of a data connection from a mobile station to a data network application via a Packet Data Serving Node (PDSN), the information would have to be retrieved from a data source and communicated to the PDSN for transmission to an Authentication, Administration, and Accounting (AAA) server.

In another example, certain applications may require quality of service policies (QoS) implemented. If call control signaling is implemented beyond the PDSN (or whatever device connects the access network to the data network), such as somewhere in the data network, additional functionalities and resources are needed to impose QoS policies. For example, resource management protocols, such as RSVP or COPS, would be needed thereby adding complexity to the system.

As 3G becomes more accepted and its use becomes more pervasive, the integration of call control signaling and network access signaling would be desirable.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION

A. Overview

In accordance with exemplary embodiments, systems and methods are provided to integrate call control with network access components. Network access components operate to provide users with access to data network applications. Typically, users initiate data network connections via an access network in accordance with the users' service. For data network applications, the access network typically negotiates call control functions with a call control server on the data network. In accordance with exemplary embodiments, a call control server agent advantageously performs call control functions from within an access network edge device connecting the access network to the data network. For example, call control functions may better control quality of service (QoS) policy implementation at the network access edge. In another example, the integration of call control functions in the network access pathway provides the access network service provider with information that may be used in billing that would otherwise be unavailable.

One of ordinary skill in the art would appreciate that these are mere examples of advantages and features available to users from exemplary embodiments, and that other advantages and features may be available.

B. System with Integrated Signaling Path and Call Control Functions

Figure 1:
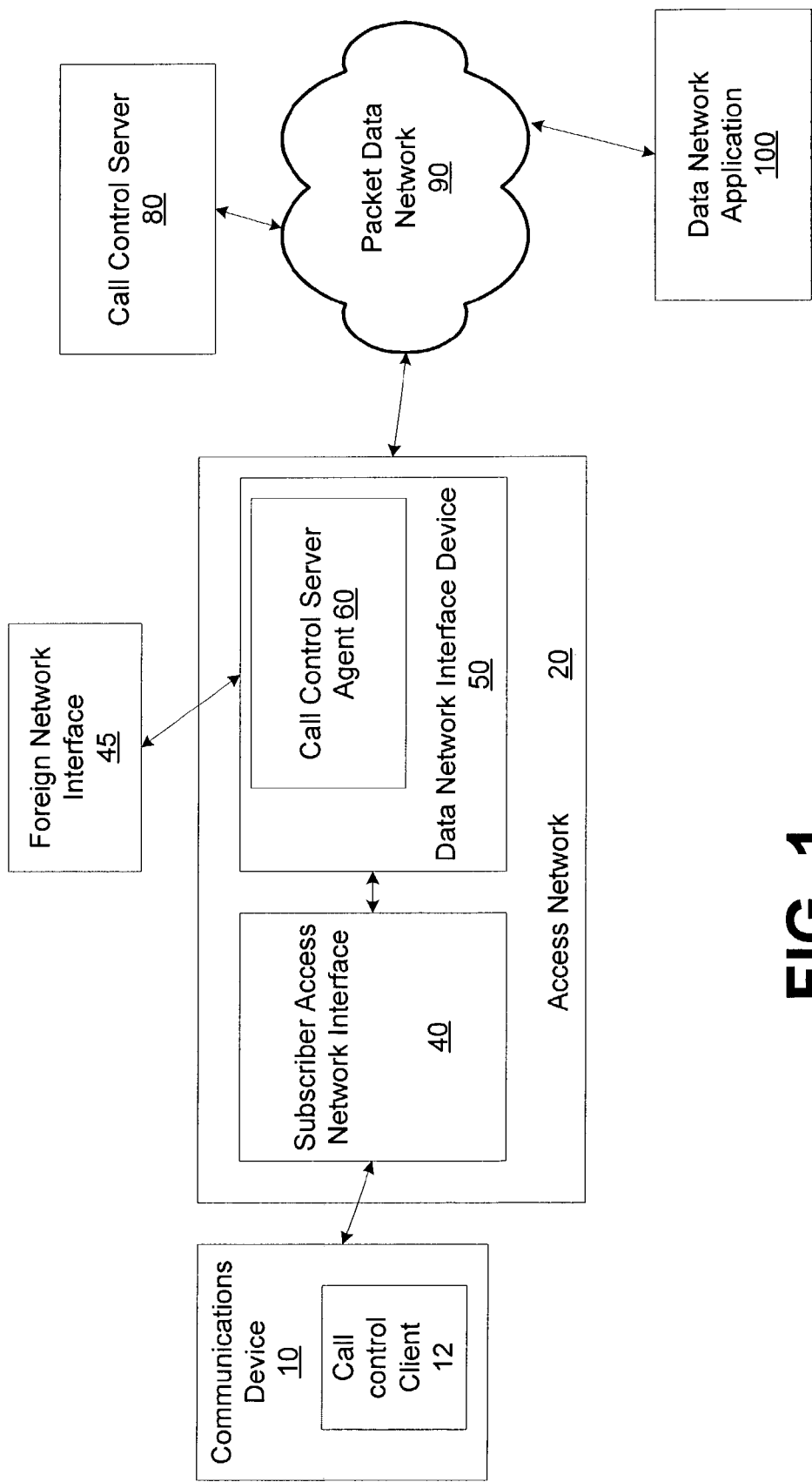
FIG. 1 is a block diagram of an access network that provides a user with access to data network applications in accordance with an exemplary embodiment.

FIG. 1 depicts operation of a system in which exemplary embodiments find advantageous use. The system provides a user of a communications device 10 with access to a data network application 100 over a data packet network 90. The user connects via an access network 20 comprising a subscriber access network interface 40 and a data network interface device 50.

In an exemplary embodiment, the access network 20 provides the user with local network services as a subscriber to a service provider. For example, the access network 20 may be a wireless telecommunications network such as a cellular network, or a landline telecommunications system. Part of the user's service on the wireless telecommunications network may include the capability of connecting to the packet data network 90 to use at least one data network application 100. In an exemplary embodiment, the access network 20 is preferably a third generation (3G) wireless communications system. The access network 20 may also be a local area network such as an 802.11 network or an Ethernet-based network.

The communications device 10 may be any suitable device with the capability of using applications available on the data network 90. Such devices include mobile stations (e.g. cellular telephones, handheld computers or personal digital assistants (PDA), and laptop computers), digital telephones, and personal computers. The user initiates a request for access to a data network application 100 using the communications device 10. For example, the request to access the data network application 100 may be a call origination request to initiate a call to a callee using Voice over Internet Protocol (VoIP) services for a VoIP telephone call, or for a Push-to-Talk application. The call origination request preferably complies with standard signaling message protocols implemented in typical 3G telecommunications systems. The call origination request initiates the data network connection by ensuring that the call is routed via the subscriber access network interface 40 as opposed to the typical infrastructure used to route calls. The access network 20 detects the request for access to the at least one data network application 100 and processes the request in a subscriber access network interface 40. The subscriber access network interface 40 establishes a packet-based connection to the data network interface device 50 in response to the request.

The communications device 10 follows up with a data session request to establish the connection to a resource on the packet data network 90 that implements the data network application 100. The communications device 10 may have a call control client 12 application or software component resident on it to send a data session request over the packet-based connection. A call control server 80 connected to the packet data network 90 receives the data session request and operates to connect the communications device 10 to the desired resource. In an exemplary embodiment, the call control server 80 and call control client resident on the communications device 10 support each other using a call control protocol. The call control server 80 performs functions in accordance with the call control protocol that permit the call control client to connect with resources over the packet data network 90. In a preferred embodiment, the call control protocol is the Session Initiation Protocol (SIP). For more information regarding SIP, reference is made to Hanley, Schulzrinne, "SIP: Session Initiation Protocol," RFC 2543, March 1999, which is incorporated herein by reference in its entirety. RFC 2543 is available from the Internet Engineering Task Force ("IETF"). One of ordinary skill in the art will appreciate that SIP is described here as an example and that other call control protocols may be used.

The call control server 80 is typically accessible over the packet data network 90. However, the data network interface device 50, the access network 40 interface to the packet data network 90, is typically the "edge" of the signaling pathway of the access network 40. That is, the access network 40 signaling operates to direct the call to the data network interface device 50. If the user at the communications device 10 communicates with the call control server 80 to set up the connection on the packet data network 90 over the packet data network 90, the signaling messages for the data connection are separate from those of the access network 40. In an exemplary embodiment, a call control server agent 60 performs a subset of functions performed by the call control server 80 in accordance with the call control protocol and resides on the data network interface device 50. The call control server agent 60 receives the data session request and establishes a data session with a resource performed by the at least one data network application 100.

The call control server agent 60 preferably resides in the data network interface device 50 that provides the first "hop" into the packet data network 90. In a 3G wireless network, the data network interface device 50 may be a Packet Data Serving Node or a GPRS Gateway Serving Node (GGSN). Exemplary embodiments are not limited, however, to implementation in 3G systems. For example, on an 802.11 network, a roaming gateway is typically used to facilitate authentication of the mobile station and for access control to the network. The roaming gateway may therefore also serve as a Mobile IP foreign agent that may be implemented as the data network interface device 50 shown in FIG. 1. In general, the data network device 50 may also be a router in a wired network.

FIG. 1 also depicts access to the data network application 100 from a foreign network interface 45 connected to the data network interface device 50. A foreign network may be any type of network operable to communicate with the data network interface device 50 using suitable communications protocols. The foreign network interface 45 may typically provide a user of a data terminal with access to other data network services. Through protocols such as Layer 2 Tunneling Protocol (L2TP), IP Security (IPsec), and other similar protocols, the terminal may connect to the data network application 100. For example, a user on a laptop or a personal computer may use a Push To Talk application that may establish a connection over the foreign network interface 45 to the data network interface device 50 as access to another user accessible by the data network. The user may also make VoIP calls via the foreign network.

The system shown in FIG. 1 advantageously allows a user to access a wide variety of data network applications with the communications device 10. Examples of such applications include a push-to-talk feature implemented over the packet data network 90, VoIP applications, and other applications. By integrating the call control and network access components, information about data connections may be better shared between the access network provider and the data network providers. The shared information may be utilized in a wide variety of scenarios. For example, the access network 40 may require certain quality of service (QoS) policies, or may need to negotiate QoS policies with other access networks. In accordance with exemplary embodiments, the data network interface device 50 may retrieve and impose the desired QoS policies via the call control server agent 60 directly during call setup. In addition, the call control server agent 60 in exemplary embodiments may detect or sense information about the connection, such as its initiation, its termination, any errors and the quantity of data (e.g. a byte count) communicated over the connection.

C. Exemplary Wireless Networks

1. Integrating the Signal Path with Call Control in the PDSN

Figure 2:
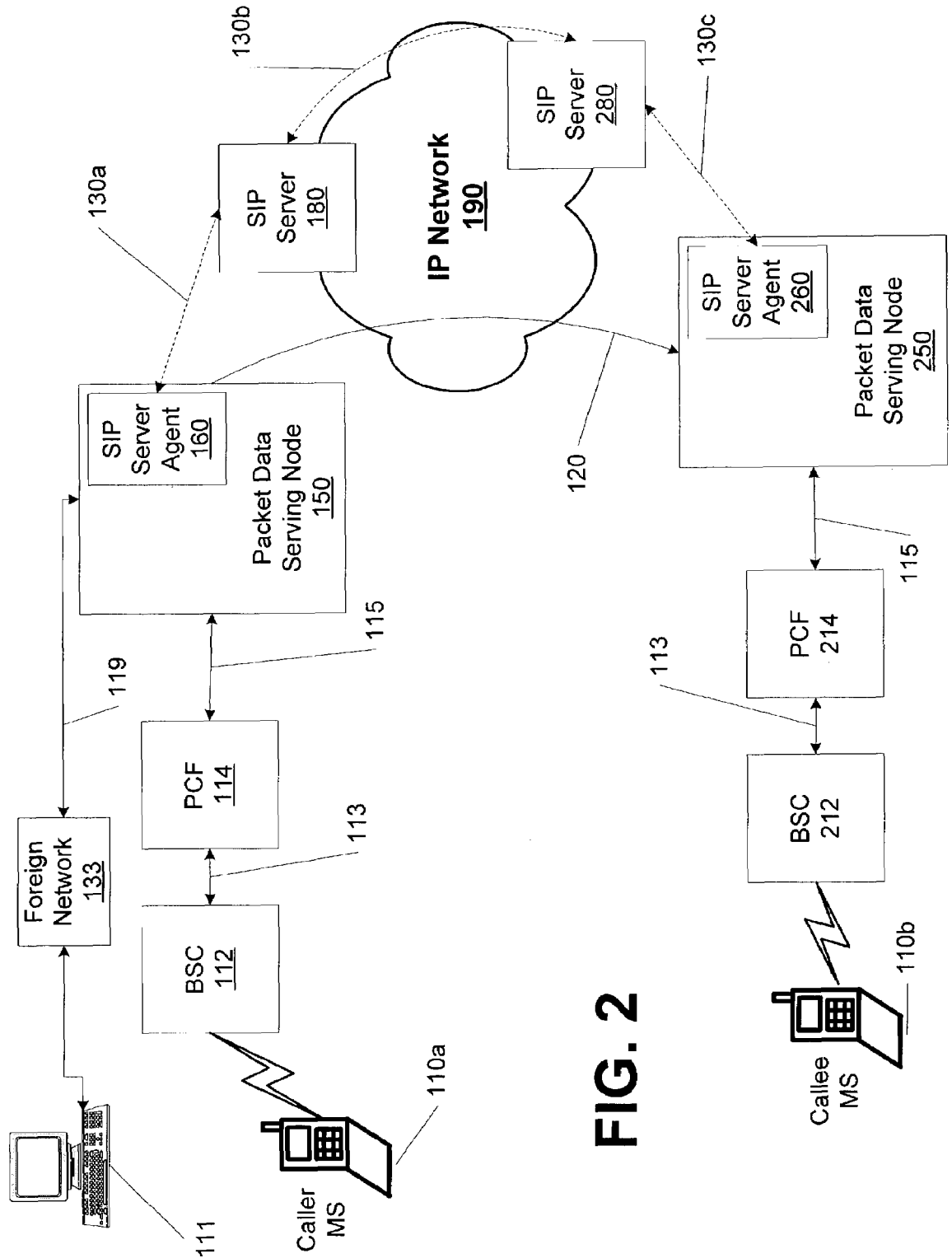
FIG. 2 is an example of the embodiment in FIG. 1 in which the data network application is a VoIP application.

In a preferred embodiment, the access network 40 in FIG. 1 is a 3G wireless network. FIG. 2 depicts operation of the system of FIG. 1 in which the access network 20 is a wireless telecommunications network used by a user of a caller mobile station 110a to communicate with a callee mobile station 110b using a push-to-talk feature. The caller mobile station 110a communicates over a radio access network (RAN) comprising a base station controller (BSC) 112 and a packet control function (PCF) 114 that connects to a packet data serving node (PDSN) 150. The PDSN 150 is the data network interface device 50 described above with reference to FIG. 1.

The RAN in FIG. 2 preferably operates in accordance with the CDMA2000 standard for 3G wireless telecommunications systems. However, one of ordinary skill in the art will appreciate that a RAN that implements the General Packet Radio Service/Universal Mobile Telecommunication System (GPRS/UMTS) may also be used.

As shown in FIG. 2, the user initiates a call to use a data network application 100 by dialing or selecting a function on the caller mobile station 110a that initiates a call origination message via an air interface to the BSC 112. For purposes of providing an example, the user of the caller mobile station 110a in FIG. 2 selects to make a push-to-talk-over IP call to a user of the callee mobile station 110b. That is, the user will "press" or "select" the callee and talk while the selection is active. While the selection is active, a data connection based on the real-time transport protocol (RTP)—or another suitable protocol—is made over the data network 90. When the user "releases" or "de-selects" the callee, the data connection is shut down.

In requesting the push-to-talk over IP application, the user selects a link (e.g. on a hot-button, or universal resource locator (URL) displayed on the mobile station 110a) that identifies the push-to-talk to a specific user. Upon making the selection, the caller mobile station 110a sends a call origination message identifying the push-to-talk function and the user identifier (e.g. telephone number, SIP identifier, email address or IP address) in a parameter list over the air interface. The air interface preferably implements the IS-707 standard (incorporated herein by reference).

The BSC 112 connects to the PCF 114 via a wired link 113 (e.g. A8 or A9) upon detecting that the user has requested a data network connection. The PCF 114 may then couple to the PDSN 150 over a generic route encapsulation (GRE) tunnel such as a radio-packet (R-P) interface 115. (For more information on GRE see request for comments (RFCs) 1701-1702, the full disclosures of which are incorporated herein by reference).

The R-P interface 115 may comprise an A-10 interface, which is used to transfer data by encapsulating data into GRE packets, and an A-11 interface, which defines signaling procedures for managing A-10 connections. (A-11 messages are based on mobile IP registration messages as defined in the Telecommunications Industry Association/Electronics Industries Alliance/Interim Standard 2001 (TIA/EIA/IS-2001), the full disclosure of which is incorporated herein by reference).

Once the PDSN 150 is reached, the caller mobile station 110a begins to negotiate a data connection with the PDSN 150. In an exemplary embodiment, the data connection uses the Point-to-Point Protocol (PPP). The PPP session is then tunneled through the RAN. With a PPP session between the caller mobile station 110a and the PDSN 150, the caller mobile station 110a may now communicate the data session request to establish a data session with a resource on the packet data network 90 that implements the desired data network application 100. In the example shown in FIG. 2, the data network application 100 is a push-to-talk over IP application. The appropriate resource would therefore be a data network device that offers an interface to a user identified in the call origination message.

In an exemplary embodiment, the caller mobile station 110a comprises a call control client 12 (See FIG. 1), which sends a data session request over the data packet network 90 in accordance with a call control protocol. In a preferred embodiment, the call control client 12 sends a SIP INVITE identifying the callee with a callee user identifier and a list of parameters describing the type of connection to be made over the packet data network 90. The callee user identifier may be any type of user identifier that is compliant with SIP and the parameter list may comprise a session description protocol (SDP) block that identifies port addresses, server address, stream protocol types and any other detail about the session.

The call control client 12 sends the SIP INVITE via the PPP session to the PDSN 150. The PDSN 150 comprises a SIP server agent 160, which operates as a SIP proxy server for the call control client 12 in the caller mobile station 110a. The SIP server agent 160 is preferably a SIP server that does not perform all of the functions of a typical SIP server. That is, the SIP server agent 160 is a server that implements a subset of the functions of a typical SIP server 180 connected to the packet data network 190.

Preferably, the SIP server agent 160 performs, at a minimum, functions performed by a SIP proxy server in accordance with SIP. The SIP server agent 160 may also be configured to forward all SIP messages on to the SIP server 180, even those messages on which the SIP server agent 160 acts.

When the call control client in the caller mobile station 110a sends the SIP INVITE, the message is received by the SIP server agent 160 in the PDSN 150. The SIP server agent 160 then broadcasts the SIP INVITE message over the IP network 190. In one exemplary embodiment, the SIP server agent 160 may send the SIP INVITE message 130a to the SIP server 180 on the IP network 190 for broadcast 130b. Once broadcast 130b, the SIP INVITE may be received by a callee SIP server 280. The callee SIP server 280 may then send the SIP INVITE to a callee SIP server agent 260.

When the callee SIP server agent 260 receives the SIP INVITE message, it initiates a data connection to the callee mobile station 110b via an R-P interface 115 with a callee PCF 214 and a wired link 113 to the BSC 212. The callee SIP server agent 260 then sends the SIP INVITE message to a SIP client on the callee mobile station 110b. The callee mobile station 110b then sends a SIP OK message back to the SIP server agent 260 for transmission back to the caller SIP server agent 160. The caller SIP server agent 160 receives the SIP OK message and, if no error is signaled, the SIP server agent 160 responsively initiates a media stream 120 between the caller PDSN 150 and the callee PDSN 250. The SIP server agent 160 also sends a SIP ACK message back to the call mobile station 110b.

The media stream 120 preferably uses the RTP protocol to carry the voice signals, however, any suitable audio communications protocol for communicating voice signals may be used. The media stream 120 is also preferably carried over a transport protocol, such as TCP/IP (i.e. Transmission Control Protocol over Internet Protocol), or UDP/IP (i.e. Universal Datagram Protocol over IP).

For more information regarding the RTP, TCP, UDP and IP protocols, reference is made to:

(1) H. Schulzrinne et al., "RTP: A Transport Protocol for Real-Time Applications," IETF RFC 1889, January 1996, which is incorporated herein by reference;

(2) D. E. Comer, Internetworking with TCP/IP, vol. 1. Englewood Cliffs, N.J.: Prentice Hall, 1991, which is incorporated herein by reference;

(3) J. Postel, "User Datagram Protocol," IETF RFC 768, August 1980, which is incorporated herein by reference; and (4) J. Postel, ed., "Internet Protocol," IETF RFC 791, September 1981, which is incorporated by reference herein.

Once the media stream 120 is initiated, the caller mobile station 110a is connected to the callee mobile station 110b by a PPP session to the caller PDSN 160, a TCP/IP or UDP/IP session over the IP network 190 and a PPP session between the callee PDSN 260 to the callee mobile station 110b. The caller and callee mobile stations 110a,b also preferably include codecs to convert voice signals to digital samples that can be carried in packets (and vice versa). The caller and callee mobile stations 110a,b preferably packetize (and de-packetize) the voice signals as RTP packets. While the caller pushes to talk to the callee, the caller mobile station 110a communicates the caller's voice to RTP packets and communicates the packets to the PDSN 150 over a PPP/IP data connection. The PDSN 150 then communicates the RTP packets over (preferably) a UDP/IP connection to the callee PDSN 250. The callee PDSN 250 then communicates the RTP packets on a PPP/IP connection to the callee mobile station 110b. As soon as the caller "de-selects" or "releases" the push-to talk application, the communication stops. The caller mobile station 110a sends a SIP BYE message to the callee mobile station 110b as soon as "de-selection" is sensed.

One of ordinary skill in the art will appreciate that a VoIP telephone application may be implemented in a similar manner by leaving the communications channels available until a "hang-up" or call tear-down is sensed at either end.

FIG. 2 also depicts operation of an exemplary embodiment in which a terminal 111 that uses services on a foreign network 133 makes a push-to-talk call to the callee 110b via the PDSN 150. The user may access a push-to-talk application on the terminal 111, which causes a foreign network connection over the foreign network 133. The foreign network 133 may be a local area network having landline connections and/or wireless connections to the users at points such as the terminal 111. The foreign network 133 may also be a second access network provided by a second service provider. Typically, the foreign network 133 uses a tunneling protocol on a foreign network connection 119 to access the PDSN 150 and then the data network 190. Examples of suitable protocols include L2TP, IPsec, the point-to-point tunneling protocol (PPTP), and the SOCKSv5 protocol. One of ordinary skill in the art will appreciate that these protocols are listed here as examples and others may be used as well.

In an exemplary embodiment, the terminal 111 may comprise a SIP client operable to send a SIP INVITE message in a manner similar to the caller terminal 110a described above. The foreign network connection 119 via the foreign network 133 is made to the PDSN 150 and to the call control server agent 160 to initiate the data session as described above.

2. Integrating the Signal Path with Call Control in the Home Agent

Figure 3:
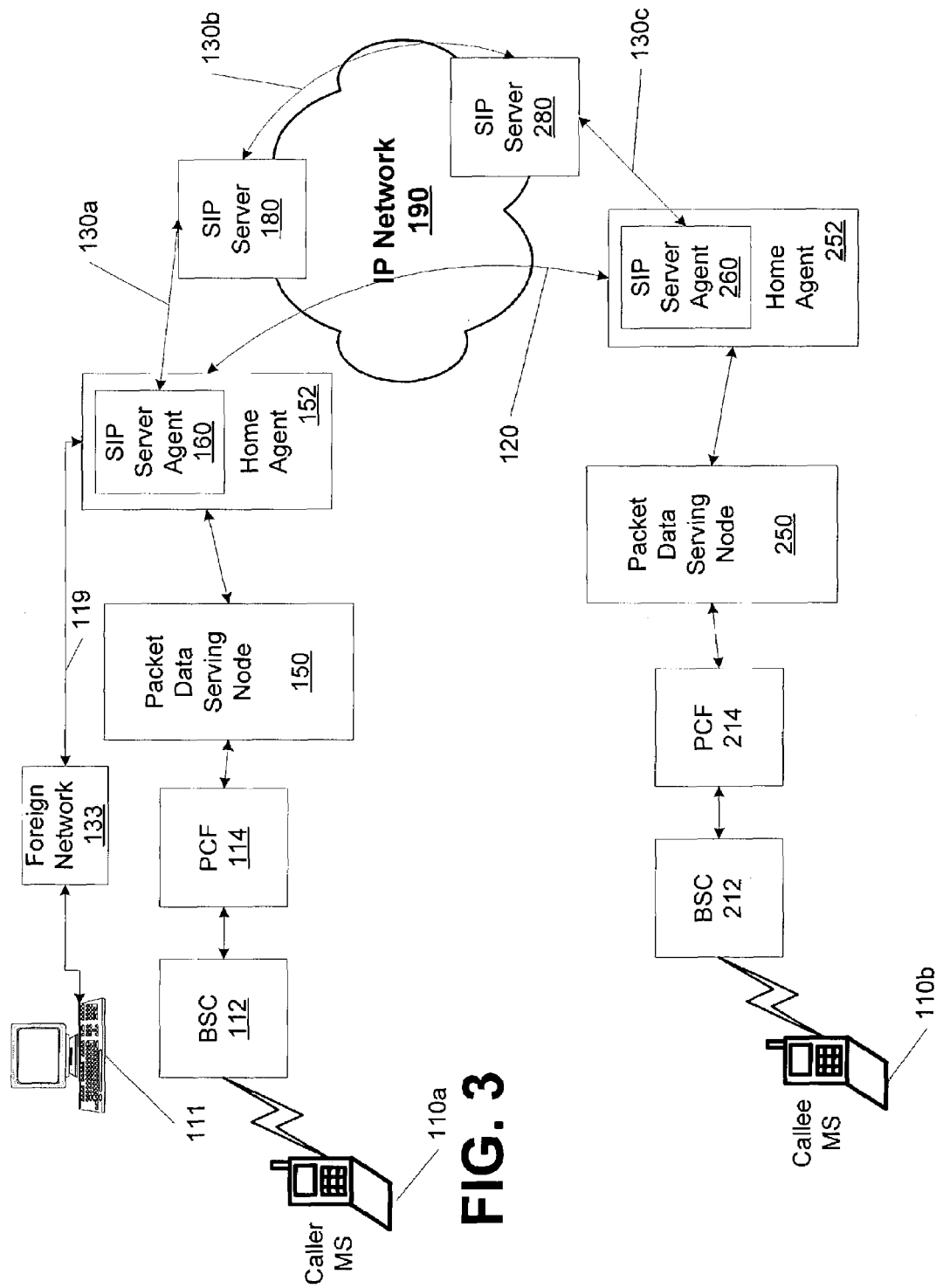
FIG. 3 is another example of the embodiment in FIG. 1 in which the data network application is a VoIP application.

In exemplary embodiments, the call control server agent 60 (in FIG. 1) or the SIP server agent 160 (in FIG. 2) are preferably resident on a network device that represents the first "hop" into the data network 190 for the user. In a wireless implementation however, the SIP server agent 160 may also be resident in a home agent 152. FIG. 3 depicts operation of a wireless implementation of exemplary embodiments in which the SIP server agent 160 resides in the Home Agent 160. FIG. 3 also depicts the terminal 111 and an exemplary embodiment in which the terminal 111 uses the push-to-talk application via the foreign network 133 over the foreign network connection 119.

D. Exemplary Methods

1. Implementing Quality of Service Policies

Figure 4:
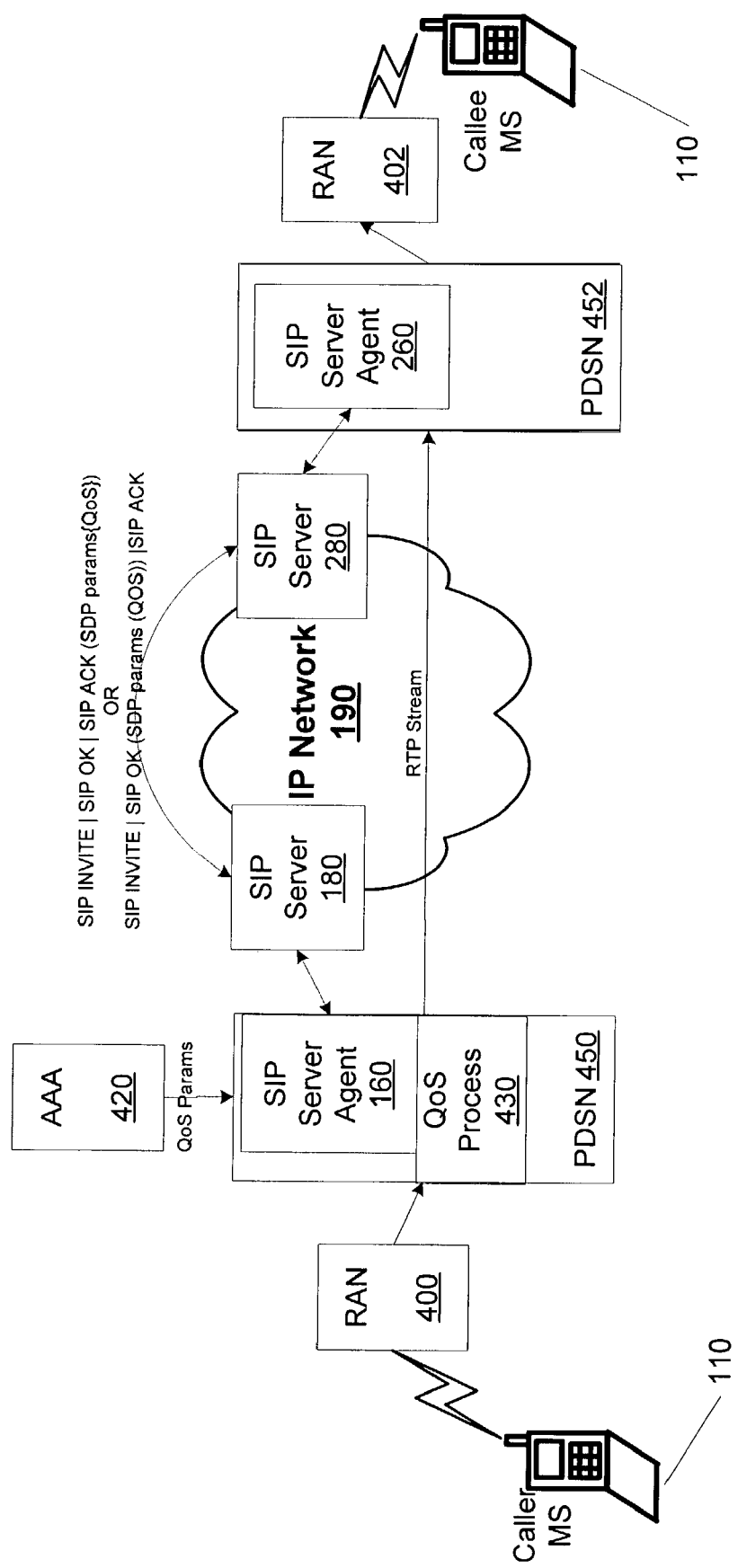
FIG. 4 depicts operation of an exemplary embodiment for implementing QoS policy.

FIG. 4 depicts operation of an example of the system described above with reference to FIG. 2 in which exemplary embodiments may be implemented to advantageously permit a service provider to directly implement Quality of Service (QoS) policies. The PDSN 450 in FIG. 4 has the SIP server agent 160 resident to effectively signal to the PDSN 450 directly when a call is established successfully, when it fails, what gets communicated and when the call ends. Also resident on the PDSN 450 in the system in FIG. 4 is a QoS process 430.

The QoS process 430 may implement a QoS policy on selected calls. A QoS policy may determine whether to:

accept or reject the requested session based on its available resources.

reserve bandwidth for the flow of data on the call.

apply appropriate traffic shaping and policing mechanisms to the flow.

The QoS process 430 may receive one or more QoS policies in several ways. First, users may subscribe to services that provision particular QoS policies. When a call is being setup, the PDSN 450 or the QoS process 430 may determine the identification of the caller from the call origination message parameters and then query for and retrieve a policy from an authentication, administration and accounting server 420. Other entities may provide the QoS policies, such as for example, the SCP, the HLR, or any other server or database that contains information about the user. Once the QoS process 430 receives the QoS parameters, the QoS process 430 imposes the QoS policy on the media stream (e.g. an RTP stream). The QoS process 430 may also receive QoS policies from a foreign network in cases where a user connects to the PDSN 450 over a foreign network as described above with respect to FIG. 2. In connections from a foreign network, QoS policies may be retrieved from any suitable source.

The QoS process 430 may also receive QoS policies from the SIP session initiation message exchange. For example, users that establish calls using SIP must be registered on a SIP server 180. In the step of registering, the user (or rather, the user's call control client) may send a SIP Register message to the SIP server 180. The call control client may impose QoS policies by including them in an SDP (Session Description Protocol) Block as a parameter. When the user's call control client sends a SIP INVITE (as described above with reference to FIG. 2), the SIP server agent 160, acting as a SIP proxy server sends the SIP INVITE message to the SIP server 180. The SIP server 180 may then add the user's SDP block containing the QoS policy with which it registered. For more information on the Session Description Protocol, reference is made to RFC 2327 (herein incorporated by reference), which is available from the IETF.

SIP servers 180 and 280 may however need to negotiate QoS parameters where there are inconsistent policies for the caller and the callee. Therefore, the SIP OK message received at the SIP server agent 160 during call setup may contain an SDP block that designates the appropriate QoS policies to use. The first SIP server 180 may also need to communicate the QoS policies to the second SIP server 280 and it may do in the SIP ACK message once the QoS process 430 determines what the QoS policy should be.

One of ordinary skill in the art will appreciate that FIG. 4 illustrates one example of imposing QoS policies by integration of call control and network access components. Other examples may be used as well. For example, QoS policies may also apply in data network connections that are not made by wireless mobile stations. One of ordinary skill in the art will appreciate for example that the PDSN 450 may be any type of router or other network interface device.

2. Communicating Information for Billing Purposes

Figure 5:
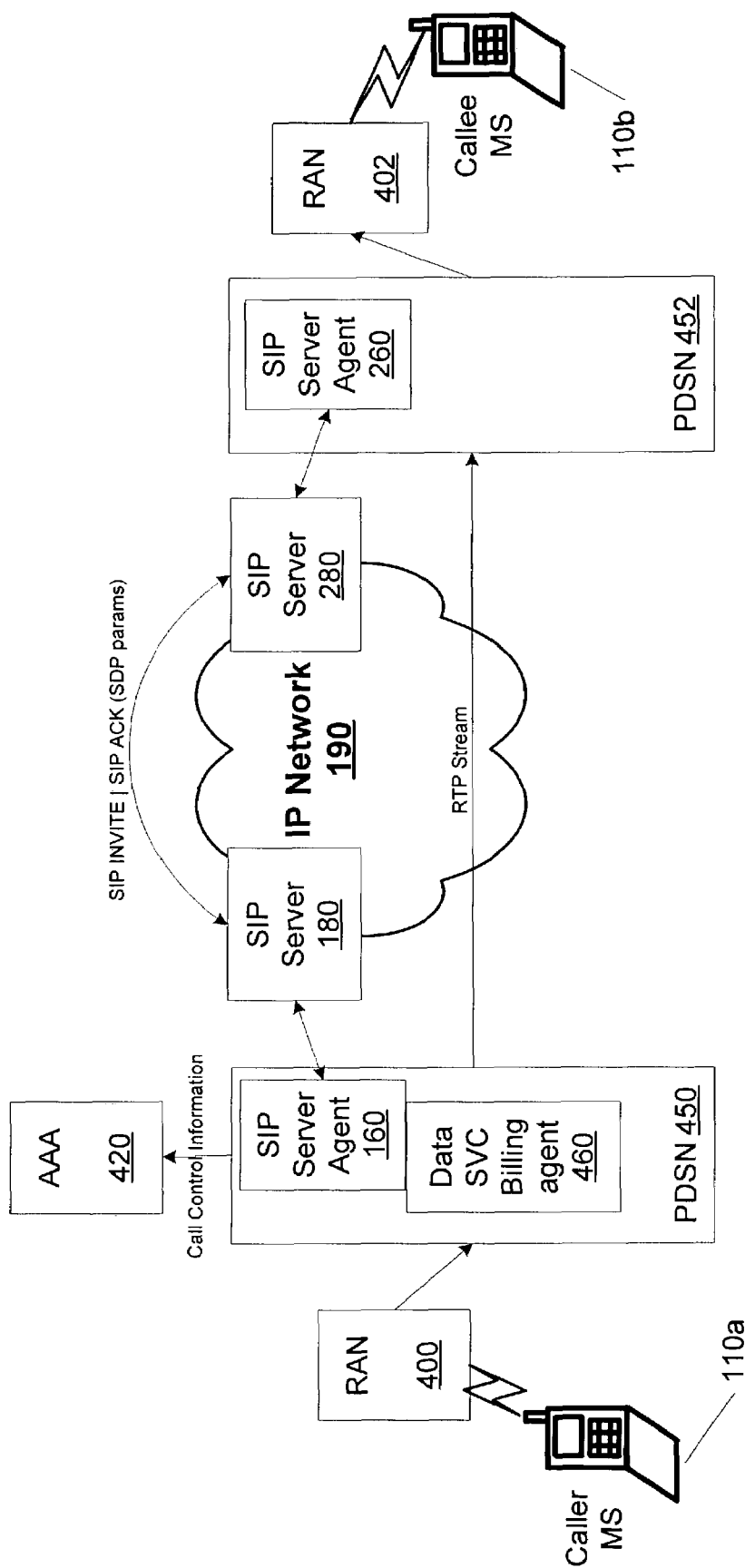
FIG. 5 depicts operation of an exemplary embodiment for obtaining billing information from a data service provider.

FIG. 5 depicts operation of an example of the system described above with reference to FIG. 2 in which exemplary embodiments may be implemented to advantageously permit a service provider to directly receive billing information from usage of data network resources. The PDSN 450 in FIG. 5 has the SIP server agent 160 resident to effectively signal to the PDSN 450 directly when a call is established successfully, when it fails, what gets communicated and when the call ends. Also resident on the PDSN 450 in the system in FIG. 4 is a data service billing agent 460.

The data service billing agent 460 may track a wide variety of types of information that would be useful to a service provider in billing the user. Such information may include:

When a call attempt to use a data network application is successful or failed.

A count of media frames sent and received at the PDSN 450.

When a call has terminated.

The data service billing agent 460 may receive information about the success or failure of call attempts and the termination of the call from the SIP server agent 160. The data service billing agent 460 may also receive information about the data that is communicated—such as the count of media frames sent and received at the PDSN 450—from an interface to the media stream (e.g. the RTP stream). Once the call is terminated, or at certain points during the call, the data service billing agent 460 may communicate billing information to the AAA server 420. In this way, the AAA server 420 advantageously retrieves the information directly from the service provider infrastructure instead of from third party sources, such as a data network service provider.

E. Conclusion

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

We claim:

1. A system for providing a user of a communications device with access to at least one data network application over a packet data network, the system comprising:
   an access network operable to provide the user with access to local network services as a subscriber to a service provider, the access network being operable to detect a request for access to the at least one data network application and to establish a packet-based connection to a data network interface device in response to the request;
   a call control client resident on the communications device operable to send a data session request over the packet-based connection to a call control server connected to the packet data network; and
   a call control server agent comprising a subset of functions performed by the call control server in accordance with a call control protocol, the call control server agent being resident on the data network interface device and being operable to receive the data session request and to establish a data session with a resource on the packet data network that implements the at least one data network application,
   wherein the call control server agent signals a data session status and the data network interface device comprises a quality of service (QoS) process operable to receive the data session status and to implement a selected set of QoS parameters on the data session.

2. The system of claim 1, further comprising an authentication server operable to provide the data network interface device with the selected set of QoS parameters.

3. The system of claim 1 wherein the call control protocol is the Session Initiation Protocol (SIP), the call control client is a SIP-compliant client, the call control server is a SIP server, and the call control server agent is operable to perform SIP proxy server functions.

4. The system of claim 3 wherein the call control server agent signals a data session status and the data network interface device comprises a quality of service process operable to receive the session status and to implement a selected set of Quality of Service (QoS) parameters on the data session.

5. The system of claim 4 wherein the call control server agent sends a SIP INVITE message having a destination identifier of the resource performed by the at least one data network application, and wherein the call control server agent receives a SIP OK message in response to the SIP INVITE message, the SIP OK message containing the selected set of QoS parameters.

6. The system of claim 5 wherein the QoS parameters are communicated in a Session Description Protocol block in the SIP OK message.

7. The system of claim 1 wherein the data network interface device comprises a data service billing agent, and wherein the call control server agent signals a session status to the data service billing agent, the data service billing agent being operable to collect call control information.

8. The system of claim 7 wherein the data service billing agent communicates the call control information to an accounting server.

9. The system of claim 1 wherein the at least one data network application comprises a push-to-talk application.

10. The system of claim 1 wherein the at least one data network application comprises a Voice-Over-Internet Protocol (VoIP) system.

11. The system of claim 1 wherein the access network is a network of a type characterized by either IEEE802.11, Wideband CDMA, CDMA2000, or UTMS/GPRS.

12. The system of claim 1 wherein the communications device is a router and the access network is a landline network.

13. The system of claim 12 wherein the landline network is a network selected from the group consisting of a public-switched telephone network (PSTN), a cable network, an Ethernet-based hard-wired network, or a hard-wired network that does not have a wireless connection to a terminal.

14. The system of claim 1 wherein the data network interface device comprises a packet data serving node (PSDN).

15. The system of claim 1 wherein the data network interface device comprises a home agent (HA).

16. The system of claim 1 wherein the data network interface device comprises a Gateway GPRS Support Node (GGSN).

17. The system of claim 1 wherein the data network interface device comprises a 802.11 Roaming Gateway.

18. The system of claim 1 further comprising:
   a foreign network operable to provide the user with access to local network services as a subscriber to a second service provider, the foreign network being operable to detect a request for access to the at least one data network application and to establish a second packet-based connection to the data network interface device in the access network in response to the request.

19. A system for providing a user of a mobile station with access to at least one data network application over a packet data network, the system comprising:
a radio access network operable to provide the user with access to wireless telecommunications services as a subscriber to a wireless service provider, the radio access network being operable to detect a request for access to the at least one data network application and to establish a packet-based connection to a wireless access component in response to the request;
a call control client resident on the mobile station operable to send a data session request over the packet-based connection to a call control server connected to the packet data network; and
a call control server agent comprising a subset of functions performed by the call control server in accordance with a call control protocol, the call control server agent being resident on the wireless access component, and being operable to receive the data session request and to establish a data session with a provider of the at least one data network application,
wherein the call control server agent signals a data session status and the wireless access component comprises a quality of service process operable to receive the data session status and to implement a selected set of Quality of Service (QoS) parameters on the data session.

20. The system of claim 19 wherein the wireless access component comprises a packet data serving node (PSDN).

21. The system of claim 19 wherein the wireless access component comprises a home agent (HA).

22. The system of claim 19 wherein the wireless access component comprises a Gateway GPRS Support Node (GGSN).

23. The system of claim 19 wherein the wireless access component comprises a 802.11 Roaming Gateway.

24. The system of claim 19, further comprising an authentication server operable to provide the wireless access component with the selected set of QoS parameters.

25. The system of claim 19, wherein the call control protocol is the Session Initiation Protocol (SIP), the call control client is a SIP-compliant client, the call control server is a SIP server, and the call control server agent is operable to perform SIP proxy server functions.

26. The system of claim 25 wherein the call control server agent sends a SIP INVITE message having a destination identifier of the resource performed by the at least one data network application, and wherein the call control server agent receives a SIP OK message in response to the SIP INVITE message, the SIP OK message containing the selected set of QoS parameters.

27. The system of claim 26 wherein the QoS parameters are communicated in a Session Description Protocol block in the SIP OK message.

28. The system of claim 19 wherein the wireless access component comprises a data service billing agent, and wherein the call control server agent signals a session status to the data service billing agent, the data service billing agent being operable to collect call control information.

29. The system of claim 28 wherein the data service billing agent communicates the call control information to an accounting server.

30. The system of claim 19 wherein the at least one data network application comprises a push-to-talk application.

31. The system of claim 19 wherein the at least one data network application comprises a Voice-Over-Internet Protocol (VoIP) system.

32. The system of claim 19 wherein the radio access network is a network of a type characterized by either IEEE802.11, Wideband CDMA, CDMA2000, or UTMS/GPRS.

33. The system of claim 19 further comprising:
a foreign network operable to provide the user with access to local network services as a subscriber to a second service provider, the foreign network being operable to detect a request for access to the at least one data network application and to establish a second packet-based connection to the data network interface device in the radio access network in response to the request.

34. A system for providing a user of a communications device with access to at least one data network application over a packet data network, the system comprising:
an access network including a subscriber access network interface, a data network interface device, and a call control server agent,
wherein the subscriber access network interface (i) receives from the communications device a request for access to the at least one data network application, and (ii) establishes a packet based connection to the data network interface device in response to the request for access,
wherein the call control server agent (i) resides on the data network interface device, (ii) receives from the communications device a request to establish a data session with a resource on the packet data network that implements the data network application, (iii) establishes the requested data session with the resource on the packet data network, and (iv) performs a call control function from within the access network, and
wherein the data network interface device provides a first hop into the packet data network.

35. The system of claim 34, wherein the access network comprises a wireless telecommunications network.

36. The system of claim 35, wherein the communications device comprises a cellular telephone.

37. The system of claim 34, wherein the access network comprises a landline telecommunications network.

38. The system of claim 34, wherein the data network interface device is a packet data serving node.

39. The system of claim 34, wherein the data network interface device is a GPRS gateway serving node (GGSN).

40. The system of claim 34, wherein the data network interface device is a router.

41. The system of claim 34, wherein the request to access the data network application comprises a request to initiate a call to a callee using voice over Internet Protocol (VoIP) services for a VoIP telephone or for a Push-to-Talk application.

42. The system of claim 34, wherein the call control server agent is operable to detect initiation of the packet based connection to the data network interface device.

43. The system of claim 34, wherein the call control server agent is operable to detect termination of the packet based connection to the data network interface device.

44. The system of claim 34, wherein the call control server agent is operable to detect a quantity of data communicated over the packet based connection to the data network interface device.

45. The system of claim 34, wherein the call control server agent is operable to perform Session Initiation Protocol (SIP) proxy server functions.

46. The system of claim 45, wherein call control server agent acts on SIP messages and forwards the SIP messages to a SIP server located across the packet data network.

47. The system of claim 45,
wherein the call control server agent sends a SIP INVITE message having a destination identifier of the resource on the packet data network that implements the data network application, and
wherein the call control server agent receives a SIP OK message in response to the SIP INVITE message, the SIP OK message containing the selected set of QoS parameters.

48. The system of claim 47, wherein the QoS parameters are communicated in a Session Description Protocol block in the SIP OK message.

49. The system of claim 34, wherein the call control server agent signals a data session status and the data network interface device comprises a quality of service (QoS) process operable to receive the session status and to implement a selected set of QoS parameters on the data session.

50. The system of claim 49, further comprising:
an authentication server operable to provide the data network interface device with the selected set of QoS parameters.

51. The system of claim 34,
wherein the data network interface device is a packet data serving node (PDSN),
wherein the PDSN includes a data service billing agent that receives from the call control server agent information selected from the group consisting of (i) information indicating whether an attempt to use the data network application is successful, (ii) information indicating a count of media frames sent and received at the PDSN, and (iii) information indicating when a call has terminated.

52. The system of claim 51, further comprising:
an Authentication, Administration, and Accounting (AAA) server,
wherein the data service billing agent communicates the information to the AAA server during the established data session.

53. The system of claim 51, further comprising:
an Authentication, Administration, and Accounting (AAA) server,
wherein the data service billing agent communicates the information to the AAA server after the established data session has terminated.

54. The system of claim 34, wherein the at least one data network application comprises a Voice-Over-Internet Protocol (VoIP) system.

55. The system of claim 34, wherein the at least one data network application comprises a push-to-talk application.

* * * * *